United States Patent [19]
Lewis

[11] Patent Number: 5,258,217
[45] Date of Patent: Nov. 2, 1993

[54] LANDFILL LINER

[75] Inventor: Stanley M. Lewis, Weston, Mass.

[73] Assignee: A/A Manufacturing, Inc., Mass.

[21] Appl. No.: 706,281

[22] Filed: May 28, 1991

[51] Int. Cl.$^5$ .................. B32B 7/00; B09B 1/00; G21F 9/00

[52] U.S. Cl. .................. 428/120; 428/99; 428/156; 428/158; 428/167; 428/172; 428/192; 428/212; 428/318.4; 428/332; 405/129

[58] Field of Search .......... 428/167, 172, 99, 119, 428/120, 141, 156, 192, 33, 158, 212, 318.4, 332; 5/417; 27/29; 405/129

[56] References Cited

U.S. PATENT DOCUMENTS

| | | | |
|---|---|---|---|
| 3,801,424 | 4/1974 | Robbins | 428/99 |
| 4,340,633 | 7/1982 | Robbins | 428/99 |
| 4,588,628 | 5/1986 | Roth | 428/99 |
| 4,692,364 | 9/1987 | Altus | 428/85 |
| 4,829,627 | 5/1989 | Altus | 428/99 |
| 4,921,742 | 5/1990 | Altus | 428/99 |
| 5,034,258 | 7/1991 | Grace | 428/99 |

Primary Examiner—Donald J. Loney
Attorney, Agent, or Firm—Anthony J. Casella; Gerald E. Hespos

[57] ABSTRACT

A landfill liner is provided for protecting soil from contaminated waste. The landfill liner includes a unitarily extruded sheet having a flexible central support defining opposed substantially parallel top and bottom surfaces. A plurality of soil gripping protrusions project unitarily from the bottom surface of the central support. The soil gripping protrusions are pointed to grippingly engage the soil being protected, and are disposed in a staggered array to prevent furrowing of the soil to which the liner is applied. A plurality of supporting protrusions project unitarily from the top surface of the central support. The supporting protrusions include substantially blunted or planar top surfaces for supporting a top liner thereon. The supporting protrusions are configured to optimize the transmissivity of waste material flowing therebetween. Edge regions of the central support are substantially free of protrusions to enable face-to-face overlapping of edge regions of the central support on adjacent liners.

20 Claims, 2 Drawing Sheets

LANDFILL LINER

BACKGROUND OF THE INVENTION

Waste disposal continues to present design challenges to environmental engineers, government officials and manufacturers of products that may produce environmentally objectionable wastes. Many waste materials decompose and leach into regions of underlying soil. In many instances the leachate flows into underground aquifers, thereby contaminating drinking water and affecting soil at locations remote from the waste disposal site.

Environmental engineers continue to develop methods for treating waste materials, including recycling selected materials and/or subjecting certain waste materials to processes that will make them less objectionable. However, acceptable treatments do not exist for many common waste products. Furthermore, even treatable wastes may require large holding areas for waste material awaiting treatment.

Many new waste disposal sites are lined to contain the waste material and to prevent such material from leaching into underlying soil and aquifers. The typical prior art liner comprises several layers that are assembled in overlapping relationship by workers at the waste disposal site. The various layers of the prior art liner assembly may be formed in wide sheets that can be rolled and delivered to the waste disposal site for subsequent unrolling and installation. The installation typically will require the sheets to be disposed with a specified overlap between the side edges of adjacent sheets. The sheets then will be welded in overlapped relationship at the installation site by an appropriate application of heat and pressure.

Many waste disposal sites are excavated depressions to be filled with the waste. An example of such a waste disposal site is depicted schematically in FIG. 1 which shows a large depression 10 dug into the soil 12. The depression 10 is characterized by a generally horizontal bottom wall 14 and a plurality of sloped side walls 16. The prior art liner assembly is identified generally by the numeral 18. The liner assembly 18 completely covers the bottom wall 14 and the side walls 16 of the excavated depression 10, and extends into overlying relationship with the surface of the soil 12 surrounding the depression 10.

The prior art liner assembly 18 is subjected to loads that tend to cause the liner assembly 18 to slide downwardly along the sloped side walls 16 and toward the horizontal bottom wall 14 of the depression 10. Such shifting of the prior art liner assembly 18 can expose regions of the uncontaminated soil 12 to the environmental impact of the waste material 20 being deposited in the depression 10. To prevent this downward shifting of the prior art liner assembly 18, many waste disposal sites dig a large ditch 22 around the entire perimeter of the depression 10. The prior art liner assembly 18 is then extended sufficiently beyond the perimeter of the depression 10 to line both the depression 10 and the peripheral ditch 22. A clean fill material 24 is then deposited onto the portion of the prior art liner assembly 18 extending across the peripheral ditch 22. The forces exerted by the fill material 24 on the portion of the prior art liner assembly 18 in the peripheral ditch 22 is intended to prevent the prior art liner assembly 18 from sliding down into the depression 10 as the waste material 20 is being deposited therein. It will be appreciated that the digging and subsequent back filling of the peripheral retention ditch 22 can add significantly to the time and cost required to prepare the depression 10 for receiving the waste material 20. Additionally, the need to have the prior art liner assembly 18 extend well beyond the perimeter of the depression 10 substantially increases the amount of liner needed, and hence increases the total cost to line the depression 10.

As shown in FIG. 2, the prior art liner assembly 18 may comprise a bottom layer 26 defining a solid planar plastic sheet having opposed smooth surfaces. A meshed or webbed transmissive layer 28 may be disposed on the solid bottom layer 26 in the prior art liner assembly 18. In some prior art systems, the transmissive layer 28 will be defined by several discrete layers exhibiting different transmissivities. For example, a web or mesh with large aperture sizes may be disposed directly on the solid bottom layer 26, and a finer textile may be laid over the web or mesh material with relatively large aperture sizes. The transmissive layer 28 is intended to enable a gravitational flow of liquid waste or leachate to a testing or collection point in the depression 10. For example, some systems will merely want to collect the liquid flowing through the deposited waste 20 for appropriate handling at another location. Other prior art systems, however, may want to provide a substantially impermeable liner assembly and will employ a solid top layer 30 over the transmissive layer 28 as depicted in FIG. 2. Leak detection means in communication with the transmissive layer 30 may be employed to detect any leakage through the solid top layer 30. In all such prior art systems, efficient predictable flowing of liquids through the transmissive layer 28 is very important. Clogging or collapsing of flow paths through the transmissive layer 28 can prevent the early detection of environmentally harmful leaks.

The transmissive layer or layers 28 and any top layer 30 that may be present necessarily contributes to the material costs for the prior art system, and the installation time and costs as well. In particular, each of the transmissive layers 28 employed in the prior art system must be separately delivered to the dump site 10 for installation after the complete installation of the bottom layer 26. The various strips of sheet material comprising the transmissive layers 28 must be properly assembled to one another and fixed relative to the peripheral retention trench 22 to prevent the entire transmissive layer 28 from sliding toward the bottom wall 14 of the prior art dump site 10. The labor costs and time required for installation and quality control can be very substantial.

In view of the above, it is an object of the subject invention to provide an environmentally protective liner for waste disposal sites.

It is another object of the subject invention to provide a liner for waste disposal sites that can substantially reduce the installation time and overall system costs for environmentally protecting soil near the waste disposal site.

A further object of the subject invention is to provide an environmentally protective liner exhibiting a high degree of transmissivity for ensuring an efficient flow of liquid waste materials through the liner.

Still another object of the subject invention is to provide an environmentally protective liner for waste disposal sites that substantially reduces the area of liner materials required to safely protect the site.

SUMMARY OF THE INVENTION

The subject invention is directed to liner assembly comprising an extruded base liner of thermoplastic material. The base liner comprises a central flexible support defining opposed top and bottom surfaces. The thickness of the central support will be selected in accordance with system specifications, as will the particular thermoplastic material from which the base liner is extruded. In a typical embodiment the central support of the base liner may define a thickness in the range of approximately 1.0-4.0 mm. The width of the base liner also will depend upon system specifications. In a typical system, the base liner will be extruded to a width of approximately 22.5 ft. and a length that may approach 1000 ft.

The bottom surface of the central support of the base liner is characterized by an array of soil gripping protrusions for engaging the soil onto which the base liner is applied. The protrusions may define a plurality of sharp conical projections extending from the central support of the base liner for grippingly engaging the soil to which the base liner is applied. The protrusions may be unitary with the central support of the base liner and may project approximately 4.0-8.0 mm. The array of soil gripping protrusions extending from the bottom surface of the central support may be disposed to prevent furrowing of the soil to which the base liner is applied. In particular, the soil gripping protrusions may be disposed in rows extending across the width of the base liner. However, the soil gripping protrusions in each row may be offset laterally from the protrusions in the rows adjacent thereto. Although a repeating pattern may exist, there may be plural rows between soil gripping protrusions that are aligned longitudinally with one another along the length of the base liner. This offset disposition of soil gripping protrusions prevents a furrowing in the soil as loads are applied to the base liner.

The top surface of the central support of the base liner comprises a plurality of supporting protrusions configured to exhibit desireable transmissivity for flow and drainage of liquids along the top surface and to support one or more additional liners. The supporting protrusions formed on the top surface may be sufficiently sturdy to prevent collapsing and may be disposed and configured to prevent a pooling of liquids or an undesired channeling of liquids. In a preferred embodiment as explained further below, the supporting protrusions on the top surface may define frustoconical projections disposed in an array across the entire top surface. In other embodiments, however, different patterns of supporting protrusions may be provided, including short linear walls, pairs of short walls intersecting in v-shaped patterns, and other configurations as explained further below.

The supporting protrusions extending from the top surface of the central support enable a flow of liquid along the top surface, and may further support additional transmissive layers thereon. For example, the base liner of the subject invention may be employed with a woven or non-woven textile or with a mesh or netting. Hence, the supporting protrusions are also sufficiently blunt to avoid piercing fabrics, meshes, webs or other transmissive materials disposed thereon. The additional transmissive layer may be disposed in overlying relationship to the above described supporting protrusions, and may be rolled with the above described base liner for subsequent unrolling at the installation site. One or more additional layers of transmissive materials or solid materials may be further employed with the base liner.

Regions of the base liner adjacent the side edges may be free of the soil gripping protrusions and supporting protrusions to facilitate welding of over lapped edge regions. Score lines or grooves may also be provided near the edges to ensure proper alignment and sufficient overlapping prior to welding.

The base liner of the subject invention may be formed by passing the extruded thermoplastic material through a pair of opposed calendering rolls with appropriately configured depressions or apertures therein. The depressions or apertures in the calendering rolls will form both the soil griping protrusions and the supporting protrusions as part of the extrusion process.

The base liner of the subject invention achieves superior gripping of the soil to which it is applied. Consequently, the sheet of the subject invention avoids the need to employ a peripheral retention ditch around the waste disposed site as had been necessary with prior art systems described above. Thus, a smaller area sheet is required and the time and cost required for site preparation and liner installation can be substantially reduced. The base liner of the subject invention further reduces the number of separate layers of material required for lining the waste disposed site. In particular, the sheet of the subject invention avoids at least one of the layers in the above described and illustrated prior art multi-layer sheet. The elimination of at least one layer substantially reduces the costs of material for lining the waste disposed site and similarly reduces installation time and costs. More importantly, the preferred pattern of transmissive projections has been found to exhibit an exceptionally high degree of transmissivity. Consequently, the flow of liquids therethrough can positively be assured.

DETAILED DESCRIPTION OF THE PREFERRED EMBODIMENT

Figure 1:
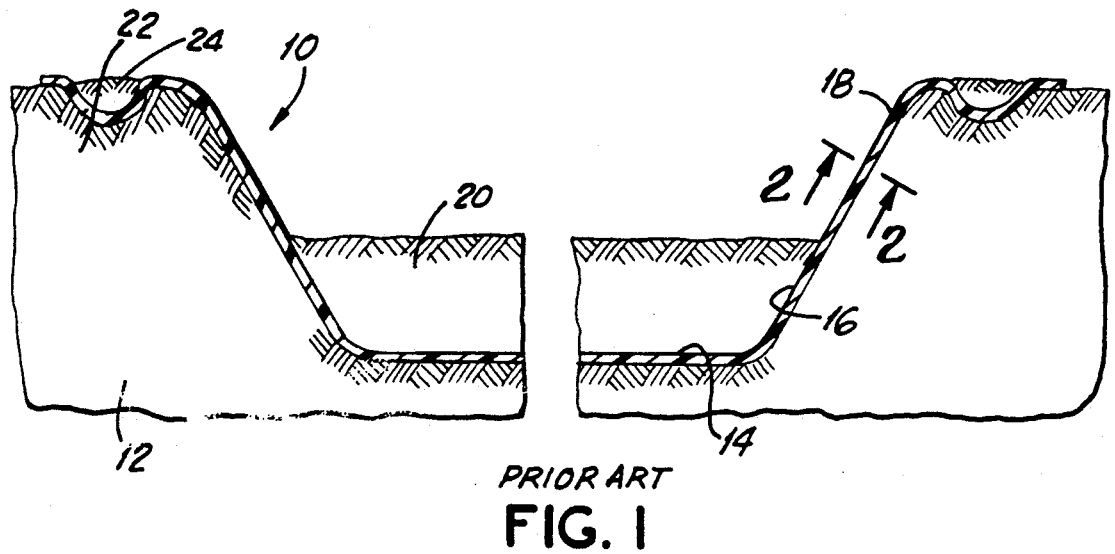
FIG. 1 is a schematic cross-sectional view of a waste disposed site employing a prior art landfill liner assembly.
Figure 2:
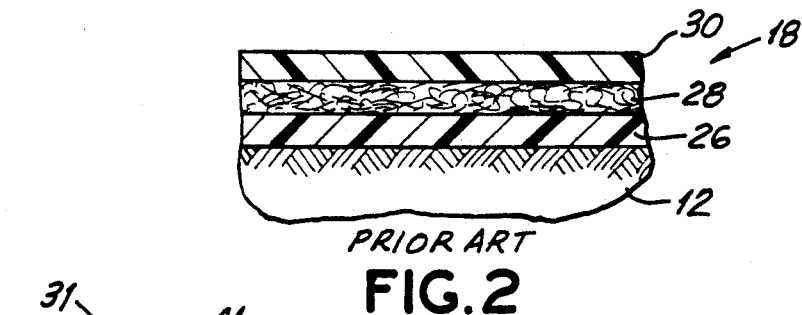
FIG. 2 is a cross-sectional view taken along line 2—2 of FIG. 1.
Figure 3:
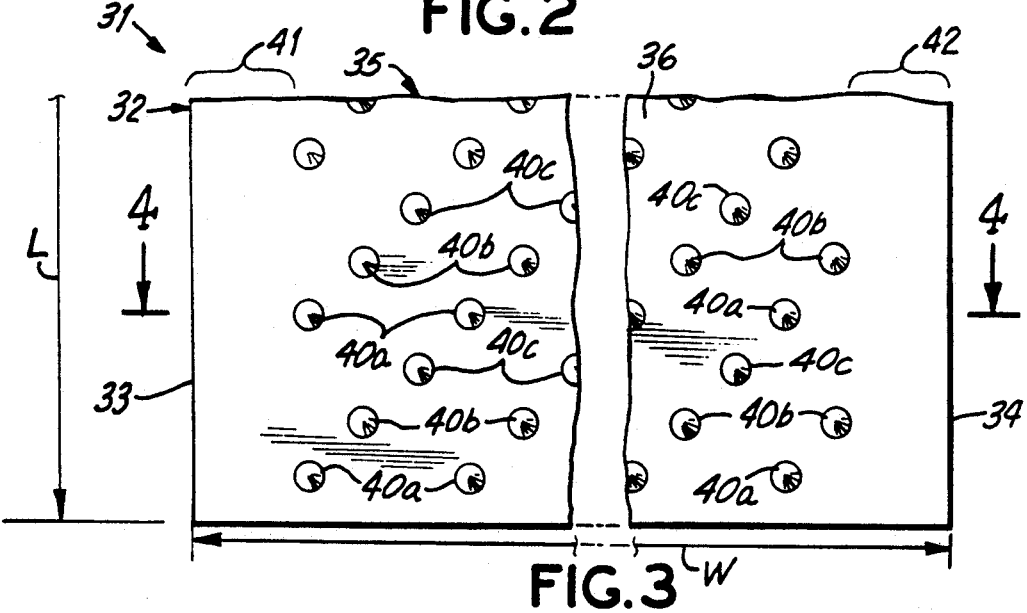
FIG. 3 is a bottom plan view of a liner assembly in accordance with the subject invention.
Figure 4:
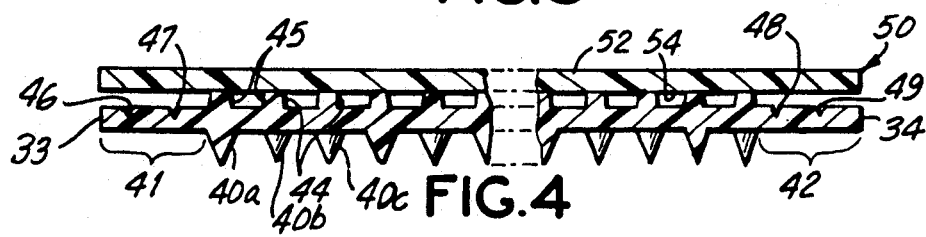
FIG. 4 is a cross-sectional view taken along line 4—4 in FIG. 3.

A landfill liner assembly in accordance with the subject invention is identified generally by the numeral 31 in FIGS. 3 and 4. The liner assembly 31 includes a base liner 32 which is a unitarilly extruded sheet of thermoplastic material. The base liner 32 includes opposed side edges 33 and 34 defining a width "W" of approximately 22.5 feet and an indeterminent length "L" that may approach or exceed 1,000 feet.

Figure 5:
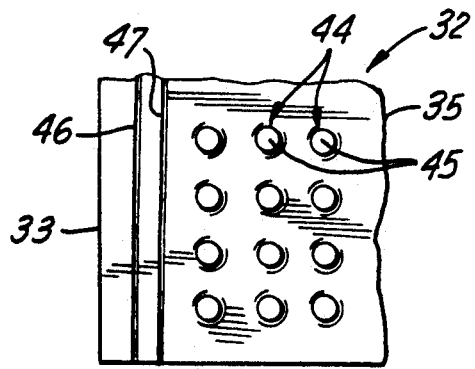
FIG. 5 is a top plan of the base liner shown in FIGS. 3 and 4.

The base liner 32 includes a central support 35 that is substantially planar, but which can be flexed to conform to the contours of the surface to which the base liner 32 will be applied. The central support 35 of the base liner 32 defines a preferred thickness "T" of approximately 2 mm as shown in FIG. 4. The central support 35 includes a bottom surface 36 as shown in FIGS. 3 and 4 and an opposed top surface 38 as shown in FIGS. 4 and 5.

The base liner 32 is characterized by soil gripping protrusions 40a–40c projecting unitarily from the bottom surface 36 of the central support 35. However, no soil gripping protrusions 40a–c are disposed along strips 41 and 42 adjacent the sides 33 and 34 to facilitate face-to-face overlapping of edge regions as explained herein. The strips 41 and 42 preferably define a width "E" of between 200–250 mm and most preferably 220 mm. Each protrusion 40a–c is generally conical and defines a sharp point for securely gripping the soil to which the base liner 32 is applied. The protrusions 40a–c preferably project a depth "D" of approximately 6 mm from the bottom surface 36 of the central support 35 as shown in FIG. 4. The soil gripping protrusions 40a–c are disposed in substantially parallel rows extending in the width direction of base liner 32. The protrusions 40a–c in any one row are spaced from one another a distance of approximately 90 mm. However, adjacent rows are spaced from one another by approximately 10 mm.

The soil gripping protrusions 40a–c in any single row are offset laterally with respect to the soil gripping protrusions 40a–c in the rows adjacent thereto. Thus, as shown in FIG. 3, the protrusions 40a are off-set laterally with respect to the protrusions 40c or the protrusions 40b in the rows adjacent thereto. However, each soil gripping protrusion 40a in one row will be longitudinally aligned with soil gripping protrusions 40a in other rows spaced longitudinally therefrom. This offset orientation of the rows of soil gripping protrusions 40a–c is provided to prevent a furrowing of the soil to which the base liner 32 is applied. Consequently, the offset disposition of the soil gripping protrusions 40a–c prevents slippage of the liner relative to the soil and avoids the need to employ the prior art means for securing a liner at a location above a slope, such as burying a liner in a peripheral retention ditch above a slope.

The base liner 32 is further characterized by a plurality of supporting protrusions 44 projecting unitarily from the top surface 38 thereof. The supporting protrusions 44 depicted in FIGS. 4 and 5 are tapered frustoconical structures with substantially flat supporting surfaces 45 at the ends thereof remote from the top surface 38 of the central support 35. As shown most clearly in FIG. 5, the supporting protrusions 44 are disposed in a generally rectangular grid array and need not be disposed in the offset pattern described with respect to the soil gripping protrusions 40a–c. However, no supporting protrusions 44 are disposed along the strips 41 and 42 of width "W" adjacent the side edges 33 and 34, to facilitate overlapping of adjacent base liners 32. The top surface 38 of the central support 35 is provided with lines 46, 47, 48 and 49 on the side strips 41 and 42 to facilitate alignment and to ensure uniform safe overlaps between adjacent base liners 32. The lines 46–49 preferably are extruded to a depth of 0.5 mm and a width of 2.0 mm. The lines 46 and 49 preferably are spaced about 150 mm inwardly from the side edges 33 and 34, while the lines 47 and 48 are spaced about 185 mm inwardly from the side edges 33 and 34. The supporting protrusions 44 do not engage the soil, but rather function to maintain a second liner in spaced relationship to the central support 35 of the base liner 32 and to enable the transmissive flow of fluids therebetween as explained further below.

The supporting protrusions 44 project approximately 3–8 mm, and preferably 5.0 mm, from the top surface 38, and are spaced from one another in both the length and width direction by approximately 10 mm. The height and spacing of the supporting protrusions 44 enables efficient support of subsequent layers and simultaneously achieves optimum transmissivity in all directions between and around the respective supporting protrusions 44. Significantly closer spacings of supporting protrusions would reduce transmissivity, while wider spacings would cause a top layer to sag between the supporting protrusion and hence also reduce permissivity.

As shown most clearly in FIG. 4, the base liner 32 of the liner assembly 31 is employed, in a preferred embodiment, with a top liner 50 having opposed top and bottom surfaces 52 and 54 which are substantially smooth. The bottom surface 54 of the top liner 50 is supported on the supporting protrusions 44 of the bottom liner 32. The assembly 31 of the base liner 32 and the top liner 50 is disposed such that the soil gripping protrusions 40a–c are in engagement with the soil being protected. The surface 52 of the top liner 50, on the other hand, is facing upwardly and will be in contact with the potentially contaminated landfill from which the ambient soil is to be protected. In most situations the top liner 50 will prevent leaching of contaminants from the landfill material. However, if material does leak through the top liner 50 it will flow efficiently between the top and base liners 50 and 32 respectively around the supporting protrusions 44 and to a selected location at which the contaminants may be detected, accumulated or treated.

As noted above, the base liner 32 may be used with other identical liners in overlapping edge-to-edge relationship to cover a very large area of soil to be protected. The overlapped edges may be adhered or welded to one another to prevent leakage therebetween. The secure attachment of adjacent edges necessarily requires the edges to be in face-to-face relationship with one another to ensure a good adhesion or welding. The amount of overlap may be specified in accordance with the plastic, the method of attachment and the type of contaminants being stored. As noted above, the soil gripping protrusions 40a–c projecting from the bottom surface 36 are spaced inwardly by a distant "E" from the side edges 33 and 34 of the sheet 32. Similarly, the supporting protrusions 44 are spaced inwardly from the side edges 33 and 34 by distance "E". With this configuration the substantially planar bottom surface 36 adjacent the edge 33 of a first base liner 32 may be disposed in substantially face-to-face contact with a planar top surface 38 adjacent the side edge 34 of a second base liner 32. This face-to-face contact between the edge regions of adjacent base liner 32 enables the central supports 34 to be securely welded or adhered in face-to-face contact with one another, thereby preventing leakage of material between adjacent base liners 32.

Figure 6:
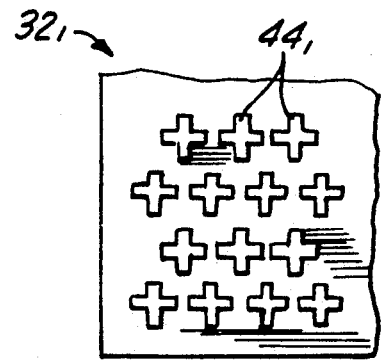
FIG. 6 is a top plan view similar to FIG. 5 but showing a second embodiment of the supporting protrusions for the subject base liner.
Figure 7:
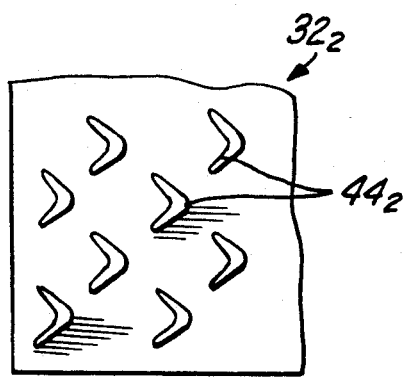
FIG. 7 is a top plan view similar to FIG. 5 but showing a third embodiment for the supporting protrusions.
Figure 8:
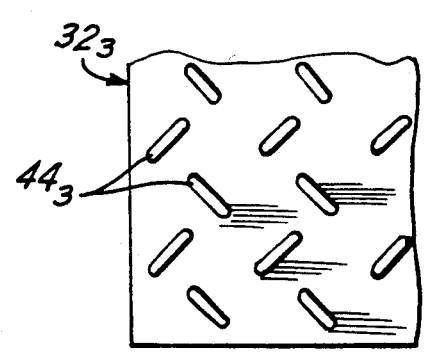
FIG. 8 is a top plan view similar to FIG. 5 but showing a fourth embodiment of the supporting protrusions.
Figure 9:
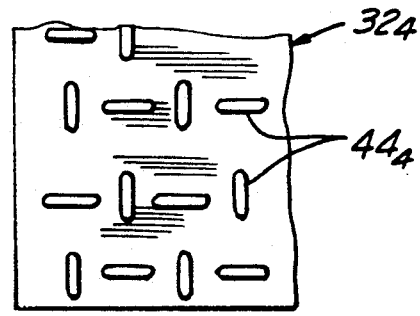
FIG. 9 is a top plan view similar to FIG. 5 but showing a fifth embodiment of the supporting protrusions.

Other embodiments for the supporting protrusions are depicted respectively in FIGS. 6-9. More particularly, the base liner $32_1$ in FIG. 6 is substantially identical the base liner 32, but shows a pattern of supporting protrusions $44_1$ that are of substantially x-shape, as opposed to the frustoconical shape of the supporting protrusions 44 depicted in FIGS. 4 and 5. The base liner $32_2$ depicted in FIG. 7 shows an array of supporting protrusions $44_2$ that are substantially v-shaped. The base liner $32_3$, as depicted in FIG. 8 shows linear supporting protrusions $44_3$ aligned substantially in a herringbone pattern. FIG. 9 shows a base liner $32_4$ with liner supporting protrusions $44_4$ aligned in alternating right angle alignments to one another. Each of the supporting protrusions $44_1$–$44_4$, as depicted in FIGS. 6-9 respectively perform a function similar to that of the supporting protrusions 44 as depicted in FIGS. 4 and 5.

Figure 10:
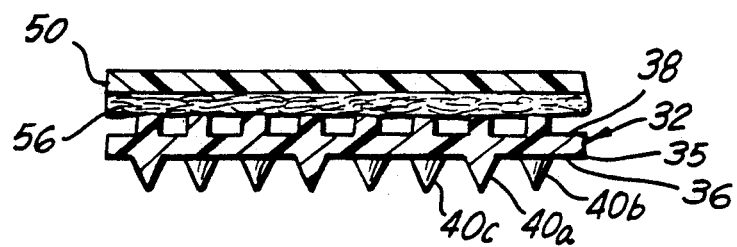
FIG. 10 is a cross-sectional view similar to FIG. 4 but showing an alternate embodiment of a multi-layer liner assembly.

The base liner 32 may be employed with plural top liners, rather than the single top liner 50 depicted in FIG. 4. In particular, a substantially porous filtering layer 56 may be disposed between the base liner 32 and the top liner 50 as depicted in FIG. 10. The porous sheet 56 may be a woven or non-woven textile filter currently available for use in soil liner systems. The porous layer 56 will be adequately supported on and not pierced by the supporting protrusions 44 shown in FIG. 10, and will subsequently support the top layer 50 thereon. Still other combinations of layers may be employed, including combinations with a base liner 32 and a top liner 50 onto which a layer of clean compacted clay may be applied. A second base liner 32 may be applied over the clay and may then have a second top liner 50 applied thereto. In this latter optional embodiment, the soil gripping protrusions 40a-c of the second bottom liner 32 will grippingly engage the compacted clay to prevent slippage.

While the invention has been described with respect to certain preferred embodiments, it is apparent that various changes can be made without departing from the scope of the invention as defined by the appended claims.

I claim:

1. An elongate landfill liner for protecting an area of soil, said landfill liner being unitarily extruded from a thermoplastic material and including opposed parallel longitudinally extending side edges, the landfill liner comprising a central support having opposed top and bottom surfaces defining a substantially uniform thickness for the central support, a plurality of soil gripping protrusions having points projecting unitarily from the bottom surface of the central support, the soil gripping protrusions at any longitudinal position along said elongate landfill liner being laterally offset from the soil gripping protrusions at longitudinal positions substantially adjacent thereto for preventing furrowing of soil to which the landfill liner is applied, the central support being substantially free of soil gripping protrusions along regions adjacent the side edges of the landfill liner, a plurality of supporting protrusions projecting unitarily from the top surface of the central support and having flat supporting surfaces spaced from and generally parallel to the central support, the central support being substantially free of supporting protrusions along regions extending adjacent the side edges of the landfill liner, whereby the soil gripping protrusions enable the liner to grippingly engage soil to be protected by the liner, whereby the regions of the central support adjacent the edges that are free of the respective supporting protrusions and soil gripping protrusions enable edge regions of the central support to be secured in face-to-face contact with edge regions of a central support of a second landfill liners, and whereby the supporting protrusions enable support of a top liner in spaced relationship to the central support of the landfill liner.

2. A landfill liner as in claim 1, wherein the soil gripping protrusions are substantially conical.

3. A landfill liner as in claim 1, wherein the soil gripping protrusions are disposed in an array of parallel rows, adjacent rows being offset laterally relative to one another for preventing furrowing of soil to which the liner is applied.

4. A landfill liner as in claim 1, wherein each said supporting protrusion is of truncated frustoconical configuration.

5. A landfill liner as in claim 1, wherein each said supporting protrusion is of substantially x-shape.

6. A landfill liner as in claim 1, wherein each said supporting protrusion is of chevron-shape.

7. A landfill liner as in claim 1, wherein each said supporting protrusion is of substantially linear and is aligned at an angle to the supporting protrusions adjacent thereto.

8. A landfill liner as in claim 1, wherein said supporting protrusions are disposed at center-to-center spacings of about 10 mm.

9. A landfill liner as in claim 1 further comprising alignment grooves in the central support for ensuring a specified overlap between adjacent liners.

10. A landfill liner as in claim 1, wherein the soil gripping protrusions and the supporting protrusions have selected spacings therebetween, the regions of the top and bottom surfaces adjacent the side edges that are free of said protrusions defining widths greater than the spacing between said protrusions.

11. An elongate landfill liner assembly for protecting an area of soil, said landfill liner assembly comprising at least one base liner unitarily extruded from a thermoplastic material, the base liner including a flexible central support having opposed top and bottom surfaces and opposed longitudinally extending side edges, a plurality of soil gripping protrusions having points projecting unitarily from the bottom surface of the central support, the soil gripping protrusions at any longitudinal position along the central support being laterally offset relative to soil gripping protrusions at longitudinal positions adjacent thereto, the central support being substantially free of soil gripping protrusions along regions adjacent the side edges of the flexible central support, a plurality of supporting protrusions projecting unitarily from the top surface of the central support and having flat supporting surfaces spaced from and generally parallel to the central support, the central support being substantially free of supporting protrusions along regions adjacent the side edges of the central support, at least one top layer supported on the flat supporting surfaces of the supporting protrusions of the base liner and in spaced relationship to the central support to enable transmission of fluids between the top layer and the central support of the base layer.

12. A landfill liner assembly as in claim 11, wherein the at least one top layer comprises a solid smooth layer of thermoplastic material.

13. A landfill liner assembly as in claim 12, wherein the at least one top layer further comprises a porous layer disposed intermediate the solid smooth layer and the base liner.

14. A landfill liner assembly as in claim 11, wherein the top layer comprises a porous layer formed from thermoplastic fibers supported on the supporting protrusions of the base liner.

15. A landfill liner assembly as in claim 11, wherein the supporting protrusions are of frustoconical shape.

16. A landfill liner assembly as in claim 15, wherein the supporting protrusions are disposed at center-to-center spacings of approximately 10 mm.

17. A landfill liner assembly as in claim 11, wherein the soil gripping protrusions are conical.

18. A landfill liner assembly as in claim 11, wherein the soil gripping protrusions and the supporting protrusions have selected spacings therebetween, the regions of the top and bottom surfaces adjacent the side edges that are free of said protrusions defining widths greater than the spacing between said protrusions.

19. A landfill liner assembly as in claim 18, wherein said at least one base liner comprises first and second base liners, regions of the bottom surface of the first base liner adjacent one said edge thereof being welded in face-to-face contact with regions of the top surface of the second base liner adjacent one said edge thereof.

20. A landfill liner assembly as in claim 19, wherein the top surface of the base liner includes at least one alignment groove extending parallel to the edges thereof and along the regions of the top surface free of said supporting protrusions, the edge of the first base line disposed in overlapping relationship with the second base liner being substantially registered with the groove.

* * * * *